United States Patent
Kuzuhara et al.

(10) Patent No.: US 8,693,113 B2
(45) Date of Patent: Apr. 8, 2014

(54) INNER FOCUS LENS, INTERCHANGEABLE LENS DEVICE AND CAMERA SYSTEM

(71) Applicant: Panasonic Corporation, Osaka (JP)

(72) Inventors: Satoshi Kuzuhara, Hyogo (JP); Takuya Imaoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/666,440

(22) Filed: Nov. 1, 2012

(65) Prior Publication Data

US 2013/0242175 A1 Sep. 19, 2013

(30) Foreign Application Priority Data

Mar. 15, 2012 (JP) ................................. 2012-058298
Oct. 1, 2012 (JP) ................................. 2012-219653

(51) Int. Cl.
- *G02B 9/04* (2006.01)
- *G02B 9/06* (2006.01)
- *G02B 9/00* (2006.01)
- *H04N 5/228* (2006.01)

(52) U.S. Cl.
USPC ......... 359/793; 359/794; 359/754; 348/208.4

(58) Field of Classification Search
CPC .............. G02B 9/04; G02B 9/06; G02B 9/60; G02B 9/62; H04N 5/228; H04N 5/232
USPC .......... 348/208.4, 208.11; 359/754, 755, 756, 359/759, 793, 794
See application file for complete search history.

(56) References Cited

U.S. PATENT DOCUMENTS

| | | | |
|---|---|---|---|
| 6,115,188 A | 9/2000 | Nishio et al. | |
| 6,317,275 B1 | 11/2001 | Yoneyama | |
| 8,411,369 B2 * | 4/2013 | Muratani et al. | 359/686 |
| 8,503,096 B2 * | 8/2013 | Imaoka et al. | 359/684 |
| 2013/0242163 A1 * | 9/2013 | Kuzuhara et al. | 348/345 |
| 2013/0293767 A1 * | 11/2013 | Imaoka et al. | 348/345 |

FOREIGN PATENT DOCUMENTS

| | | |
|---|---|---|
| JP | 5-142469 | 6/1993 |
| JP | 6-138385 | 5/1994 |
| JP | 2000-89101 | 3/2000 |
| JP | 2000-347099 | 12/2000 |
| JP | 2011-59726 | 3/2011 |
| JP | 2011-112957 | 6/2011 |
| JP | 2011-209347 | 10/2011 |

* cited by examiner

*Primary Examiner* — David N Spector

(74) *Attorney, Agent, or Firm* — Wenderoth, Lind & Ponack, L.L.P.

(57) ABSTRACT

There are provided an inner focus lens consisting of a first lens group, an aperture diaphragm, and a second lens group in order from an object side. The first lens group has a positive first lens element, a positive second lens element, and a negative third lens element, or has a positive first lens element, a positive second lens element, a positive third lens element, and a negative fourth lens element, in order from the object side. One lens element in the second lens group is moved with respect to an image surface in focusing. The second lens group has five or more lens elements, and has a configuration including a negative lens element, a positive lens element, and a positive lens element in order from the object side.

12 Claims, 10 Drawing Sheets

INNER FOCUS LENS, INTERCHANGEABLE LENS DEVICE AND CAMERA SYSTEM

BACKGROUND

1. Technical Field

The technical field relates to a novel inner focus lens, interchangeable lens device, and camera system. Particularly, the technical field relates to an inner focus lens suitable for an interchangeable lens attachable to a digital single-lens reflex camera or a single-lens reflex camera for silver halide film, a digital still camera, and a camcorder, and an interchangeable lens device and a camera system using the inner focus lens.

2. Related Art

With recent increase in number of pixels of a solid-state image pickup device, higher performance has been demanded to a photographing optical system for use in this, and in addition, a lens having a bright F-number has been demanded. Furthermore, increased focus speed and a lens having small image shaking at the time of focusing have been highly demanded.

In Japanese Patent Application Laid-Open No. 2000-347099, there is disclosed an inner focus lens made up of a first lens group having positive refractive power, a second lens group having negative refractive power, and a third lens group having positive refractive power in order from an object side, wherein focusing is performed by the second lens group.

In Japanese Patent Application Laid-Open No. 2011-112957, there is disclosed an inner focus lens made up of a first lens group having positive refractive power, a second lens group having positive refractive power, and a third lens group having positive refractive power in order from an object side, wherein focusing is performed by the second lens group.

SUMMARY

However, in the lens system described in Japanese Patent Application Laid-Open No. 2000-347099, since a number of lenses of the groups in an image surface side with respect to a diaphragm is four, which is small, it is difficult to enlarge a diameter of the lens system, so that the demand for the lens having a bright F-number cannot be met.

In the lens system described in Japanese Patent Application Laid-Open No. 2011-112957, since the lens group performing the focusing is made up of two or more lenses, the demand for the increased focus speed cannot be met.

The present disclosure provides an inner focus lens, an interchangeable lens device, and a camera system in which in spite of a large diameter, correction of each aberration is beneficially performed, and increased focus speed is enabled.

One of the above-described objects is achieved by the following inner focus lens. That is, one aspect of the present disclosure relates to an inner focus lens consisting of a first lens group, an aperture diaphragm, and a second lens group in order from an object side, wherein the first lens group has a configuration including a first lens element having positive power, a second lens element having positive power, and a third lens element having negative power in order from the object side, or a configuration including a first lens element having positive power, a second lens element having positive power, a third lens element having positive power, and a fourth lens element having negative power in order from the object side, one lens element in the second lens group is moved with respect to an image surface in focusing from an infinity focusing state to a close range focusing state, the second lens group has five or more lens elements, and the second lens group has a configuration including a negative lens element, a positive lens element, and a positive lens element in order from the object side.

One non-limiting and exemplary embodiment is achieved by the following interchangeable lens device. That is, another aspect of the present disclosure relates to the interchangeable lens device including an inner focus lens and a lens mounting portion connectable to a camera body including an image pickup device that receives an optical image formed by the inner focus lens to convert the same to an electric image signal, wherein the inner focus lens consists of a first lens group, an aperture diaphragm, and a second lens group in order from an object side, wherein the first lens group has a configuration including a first lens element having positive power, a second lens element having positive power, and a third lens element having negative power in order from the object side, or a configuration including a first lens element having positive power, a second lens element having positive power, a third lens element having positive power, and a fourth lens element having negative power in order from the object side, one lens element in the second lens group is moved with respect to an image surface in focusing from an infinity focusing state to a close range focusing state, the second lens group has five or more lens elements, and the second lens group has a configuration including a negative lens element, a positive lens element, and a positive lens element in order from the object side.

One non-limiting and exemplary embodiment is achieved by the following camera system. That is, another aspect of the present disclosure relates to the camera system including an interchangeable lens device including an inner focus lens, and a camera body that is detachably connected to the interchangeable lens device through a camera mounting portion and includes an image pickup device that receives an optical image formed by the inner focus lens to convert the same to an electric image signal, wherein the inner focus lens consists of a first lens group, an aperture diaphragm, and a second lens group in order from an object side, wherein the first lens group has a configuration including a first lens element having positive power, a second lens element having positive power, and a third lens element having negative power in order from the object side, or a configuration including a first lens element having positive power, a second lens element having positive power, a third lens element having positive power, and a fourth lens element having negative power in order from the object side, one lens element in the second lens group is moved with respect to an image surface in focusing from an infinity focusing state to a close range focusing state, the second lens group has five or more lens elements, and the second lens group has a configuration including a negative lens element, a positive lens element, and a positive lens element in order from the object side.

According to the one aspect of the present disclosure, the inner focus lens can be attained, in which correction of each aberration is performed beneficially, a movement amount of the focusing is small, and weight of the focus group is light.

DETAILED DESCRIPTION

Figure 1:
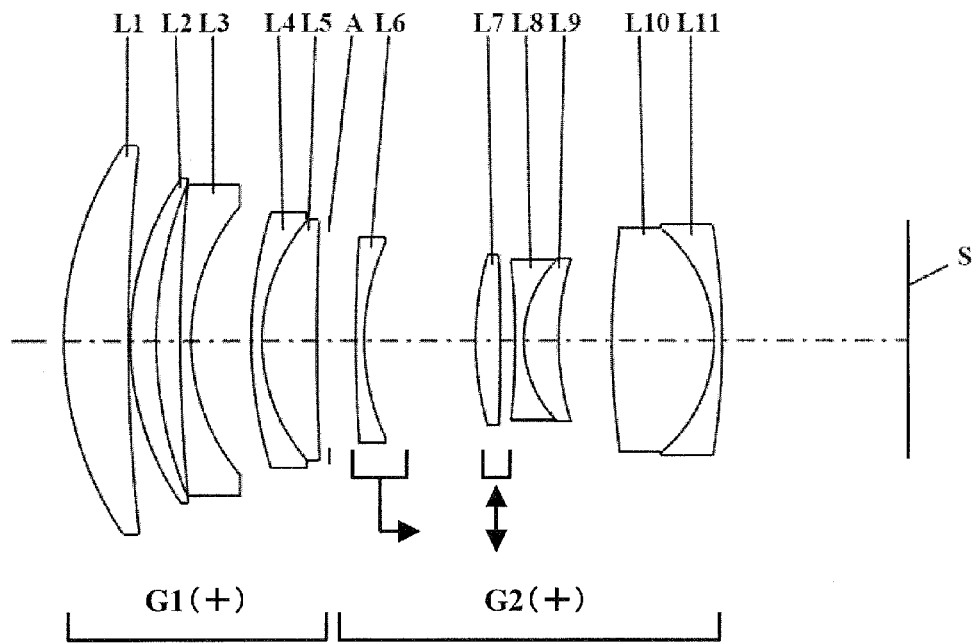
FIG. 1 is a lens cross-sectional diagram of a lens of Example 1 in First Embodiment.
Figure 2:
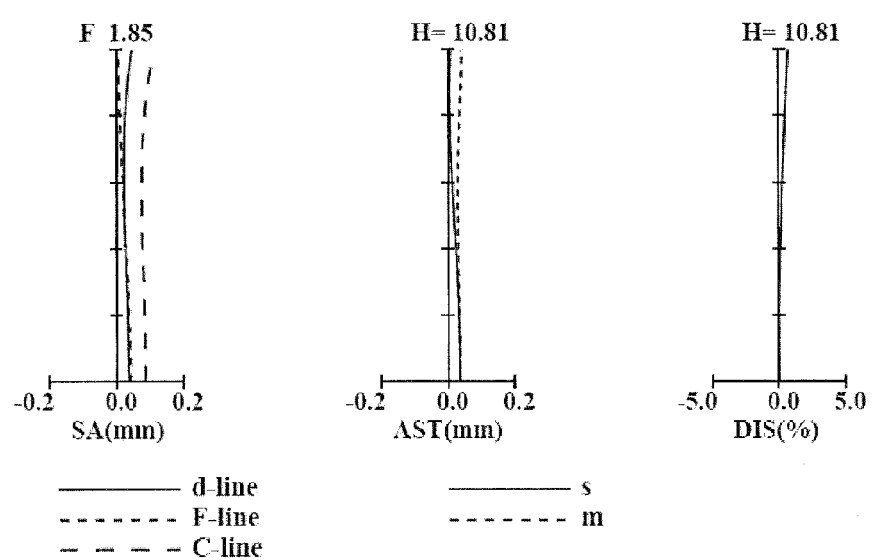
FIG. 2 is a longitudinal aberration diagram at the time of infinity focusing of the lens of Example 1.

An inner focus type optical system (may be merely referred to as an "inner focus lens"), an interchangeable lens device including this inner focus lens, and a camera system including this interchangeable lens device and a camera body will be described with reference to the drawings. In respective figures, the same or similar components are given the same reference numerals.

First to Ninth Embodiments

Specific forms of inner focus lenses of the present embodiments will be described with reference to the drawings.

FIGS. 1, 3, 5, 7, 9, 11, 13, 15, and 17 show lens configurations at the time of focusing on an object point at infinity of the inner focus lenses according to the respective embodiments. An arrow given to each lens group denotes focusing from an infinity focusing state to a close range focusing state. That is, it shows a movement direction in the focusing from the infinity focusing state to the close range focusing state. In the figures, an asterisk * given to a specific surface indicates that the surface is aspherical. Moreover, in the figures, a sign (+) or a sign (−) given to a reference numeral of each of the lens groups corresponds to a sign of power of each of the lens groups. In the respective figures, a straight line described at a rightmost position denotes a position of an image surface S.

In an inner focus lens according to First Embodiment, as shown in FIG. 1, a first lens group G1, an aperture diaphragm A, and a second lens group G2 are arrayed in order from an object side to an image surface side.

In the inner focus lens according to First Embodiment, the first lens group G1 consists of a first lens element L1 in a positive meniscus shape with a convex surface directed to the object side, a second lens element L2 in a positive meniscus shape with a convex surface directed to the object side, a third lens element L3 in a negative meniscus shape with a convex surface directed to the object side, a fourth lens element L4 in a negative meniscus shape with a convex surface directed to the object side, and a fifth lens element L5 in a positive meniscus shape with a convex surface directed to the object side in order from the object side to the image surface side. Here, the first lens element L1, the second lens element L2, and the third lens element L3 make up a first sub-lens group in the first lens group G1, and the fourth lens element L4 and the fifth lens element L5 make up a second sub-lens group. Among these, the fourth lens element L4 and the fifth lens element L5 are joined.

In the inner focus lens according to First Embodiment, the second lens group G2 consists of a sixth lens element L6 in a negative meniscus shape with a convex surface directed to the object side, a seventh lens element L7 in a biconvex shape, an eighth lens element L8 in a biconcave shape, a ninth lens element L9 in a positive meniscus shape with a convex surface directed to the object side, a tenth lens element L10 in a biconvex shape, and an eleventh lens element L11 in a negative meniscus shape with a convex surface directed to the image surface side. Among these, the eighth lens element L8 and the ninth lens element L9 are joined, and the tenth lens element L10 and the eleventh lens element L11 are joined. Moreover, the negative single lens L6 in the second lens group G2 is moved to the image surface side on an optical axis to thereby perform focusing from a side of an object at infinity to a side of an object at close range.

The positive single lens L7 is moved to a direction orthogonal to the optical axis to thereby correct image point movement by vibration of the whole system, that is, to optically correct image shaking due to hand shaking, vibration or the like. However, in the respective embodiments below including First Embodiment, a configuration for this optical correction of the image shaking is not requisite.

Figure 3:
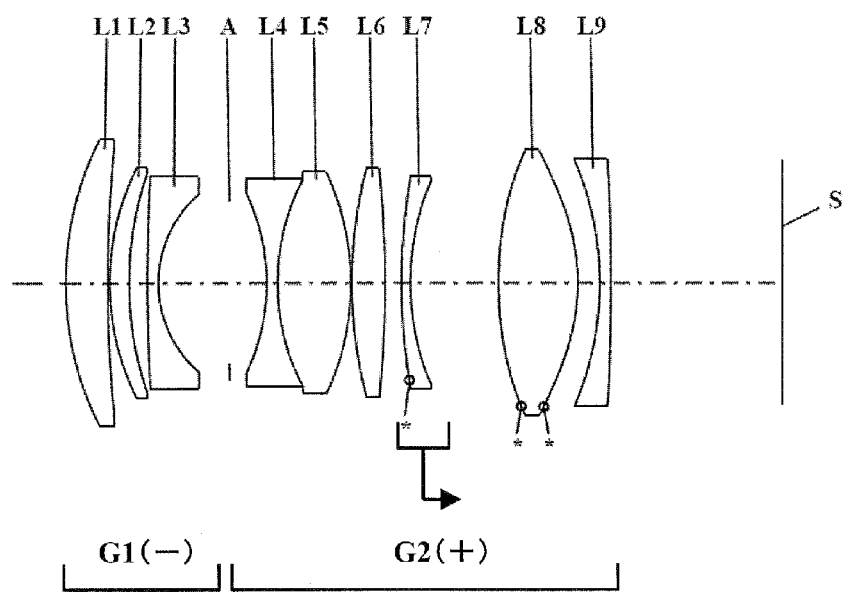
FIG. 3 is a lens cross-sectional diagram of a lens of Example 2 in Second Embodiment.
Figure 4:
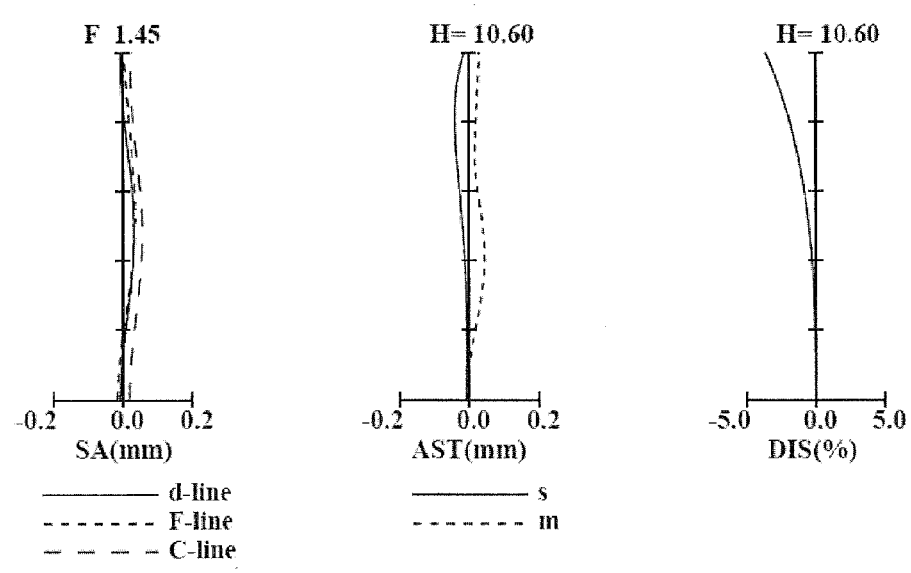
FIG. 4 is a longitudinal aberration diagram at the time of infinity focusing of the lens of Example 2.

FIG. 3 shows a lens configuration at the time of focusing on an object point at infinity of an inner focus lens according to Second Embodiment.

In the inner focus lens according to Second Embodiment, a first lens group G1, an aperture diaphragm A, and a second lens group G2 are arrayed in order from an object side to an image surface side.

In the inner focus lens according to Second Embodiment, the first lens group G1 consists of a first lens element L1 in a positive meniscus shape with a convex surface directed to the object side, a second lens element L2 in a positive meniscus shape with a convex surface directed to the object side, and a third lens element L3 in a negative meniscus shape with a convex surface directed to the object side, in order from the object side to the image surface side. In this manner, in Second Embodiment, the first lens group G1 is made up of only a first sub-lens group.

In the inner focus lens according to Second Embodiment, the second lens group G2 consists of a fourth lens element L4 in a biconcave shape, a fifth lens element L5 in a biconvex shape, a sixth lens element L6 in a biconvex shape, a seventh lens element L7 in a negative meniscus shape with a convex surface directed to the object side, an eighth lens element L8 in a biconvex shape, and a ninth lens element L9 in a negative meniscus shape with a convex surface directed to the image surface side. Among these, the fourth lens element L4 and the fifth lens element L5 are joined. Moreover, an object-side surface of the seventh lens element L7 is aspherical, and both surfaces of the eighth lens element L8 are aspherical. Moreover, the negative single lens L7 in the second lens group G2 is moved to the image surface side on an optical axis to thereby perform focusing from a side of an object at infinity to a side of an object at close range.

Figure 5:
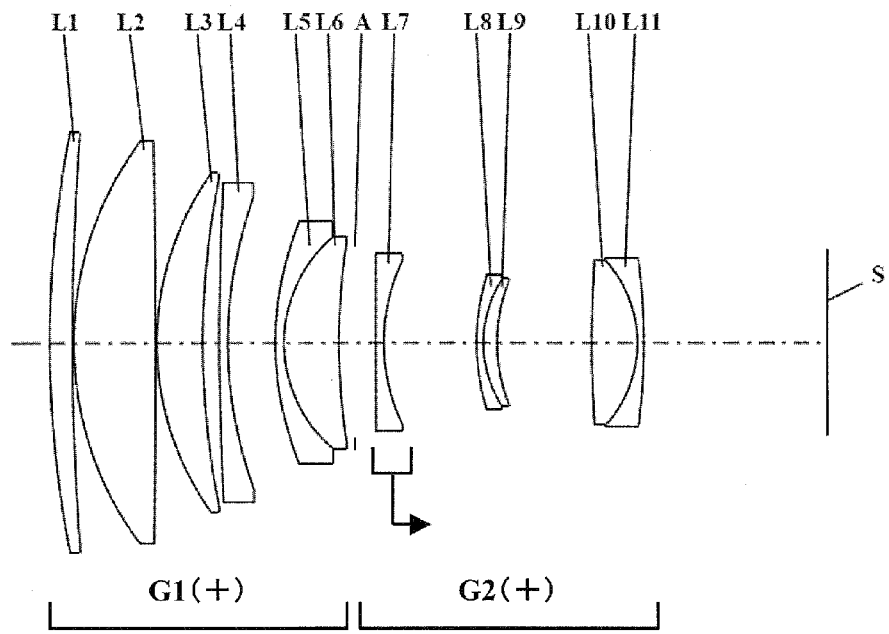
FIG. 5 is a lens cross-sectional diagram of a lens of Example 3 in Third Embodiment.
Figure 6:
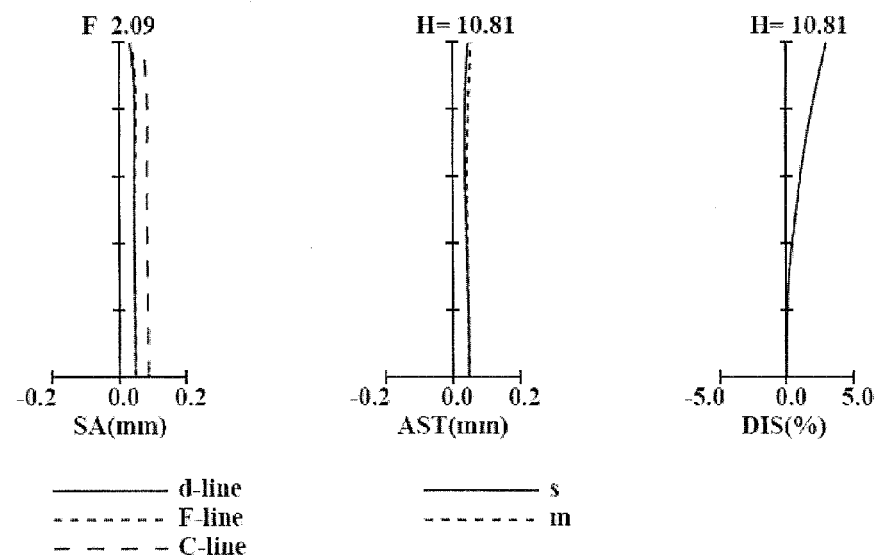
FIG. 6 is a longitudinal aberration diagram at the time of infinity focusing of the lens of Example 3.

FIG. 5 shows a lens configuration at the time of focusing on an object point at infinity of an inner focus lens according to Third Embodiment.

In the inner focus lens according to Third Embodiment, a first lens group G1, an aperture diaphragm A, and a second lens group G2 are arrayed in order from an object side to an image surface side.

In the inner focus lens according to Third Embodiment, the first lens group G1 consists of a first lens element L1 in a positive meniscus shape with a convex surface directed to the object side, a second lens element L2 in a biconvex shape, a third lens element L3 in a positive meniscus shape with a convex surface directed to the object side, a fourth lens element L4 in a negative meniscus shape with a convex surface directed to the object side, and a fifth lens element L5 in a negative meniscus shape with a convex surface directed to the object side, and a sixth lens element L6 in a positive meniscus shape with a convex surface directed to the object side in order from the object side to the image surface side. Here, in Third Embodiment, the first lens element L1, the second lens element L2, the third lens element L3, and the fourth lens element L4 make up a first sub-lens group in the first lens group G1, and the fifth lens element L5 and the sixth lens element L6 make up a second sub-lens group. Among these, the fifth lens element L5 and the sixth lens element L6 are joined.

In the inner focus lens according to Third Embodiment, the second lens group G2 is made up of a seventh lens element L7 in a negative meniscus shape with a convex surface directed to the object side, an eighth lens element L8 in a negative meniscus shape with a convex surface directed to the object side, a ninth lens element L9 in a positive meniscus shape with a convex surface directed to the object side, a tenth lens element L10 in a biconvex shape, and an eleventh lens element L11 in a negative meniscus shape with a convex surface directed to the image surface side. Among these, the eighth lens element L8 and the ninth lens element L9 are joined, and the tenth lens element L10 and the eleventh lens element L11 are joined. Moreover, the negative single lens L7 in the second lens group G2 is moved to the image surface side on an optical axis to thereby perform focusing from a side of an object at infinity to a side of an object at close range.

Figure 7:
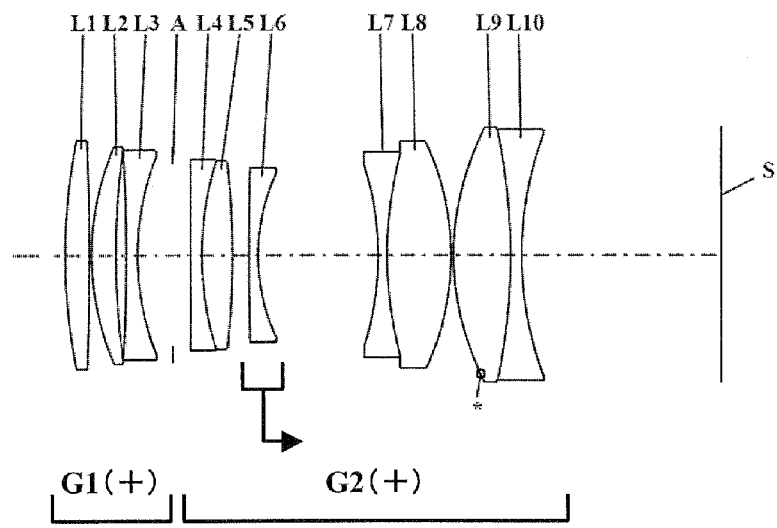
FIG. 7 is a lens cross-sectional diagram of a lens of Example 4 in Fourth Embodiment.
Figure 8:
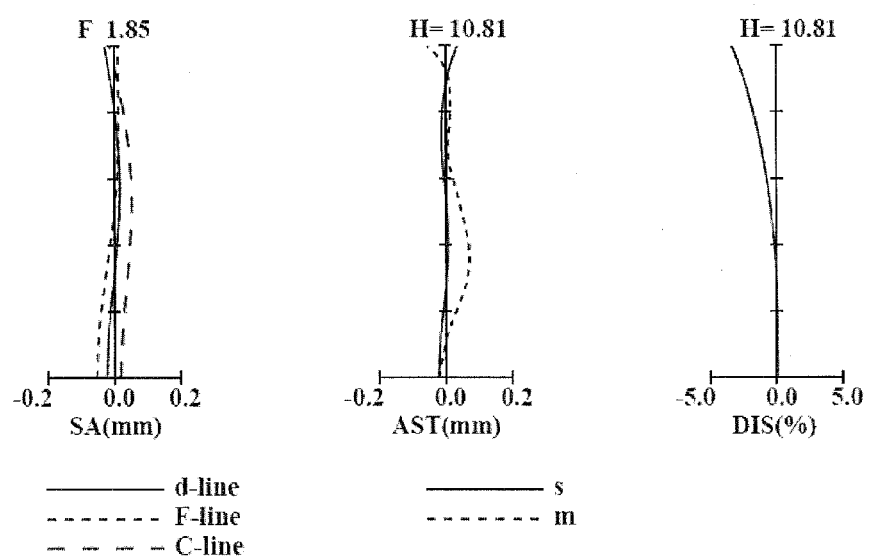
FIG. 8 is a longitudinal aberration diagram at the time of infinity focusing of the lens of Example 4.

FIG. 7 shows a lens configuration at the time of focusing on an object point at infinity of an inner focus lens according to Fourth Embodiment.

In the inner focus lens according to Fourth Embodiment, a first lens group G1, an aperture diaphragm A, and a second lens group G2 are arrayed in order from an object side to an image surface side.

In the inner focus lens according to Fourth Embodiment, the first lens group G1 consists of a first lens element L1 in a biconvex shape, a second lens element L2 in a positive meniscus shape with a convex surface directed to the object side, and a third lens element L3 in a biconcave shape in order from the object side to the image surface side. In this manner, in Fourth Embodiment, the first lens group G1 is made up of only a first sub-lens group.

In the inner focus lens according to Fourth Embodiment, the second lens group G2 consists of a fourth lens element L4 in a biconcave shape, a fifth lens element L5 in a biconvex shape, a sixth lens element L6 in a negative meniscus shape with a convex surface directed to the object side, a seventh lens element L7 in a biconcave shape, an eighth lens element L8 in a biconvex shape, a ninth lens element L9 in a biconvex shape, and a tenth lens element L10 in a biconcave shape. Among these, the fourth lens element L4 and the fifth lens element L5 are joined, the seventh lens element L7 and the eighth lens element L8 are joined, and the ninth lens element L9 and the tenth lens element L10 are joined. Moreover, the negative single lens L6 in the second lens group G2 is moved to the image surface side on an optical axis to thereby perform focusing from a side of an object at infinity to a side of an object at close range.

Figure 9:
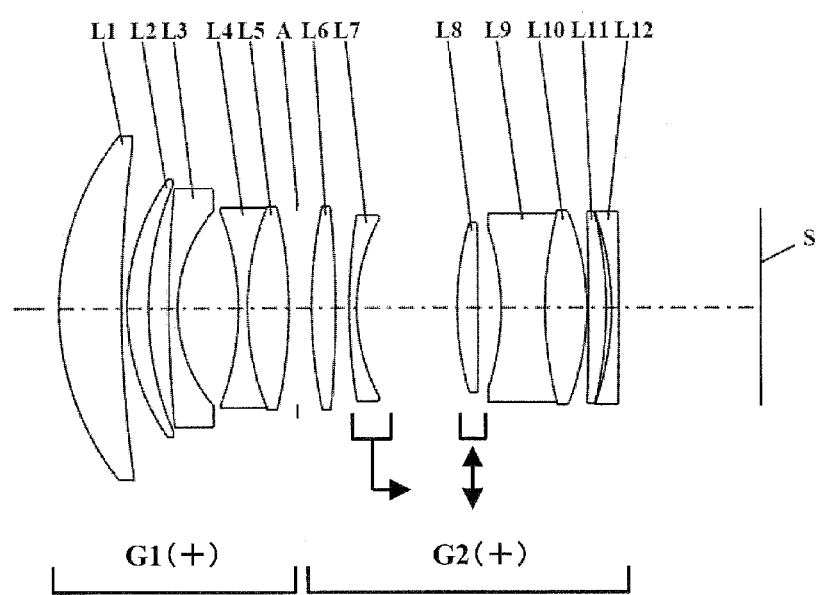
FIG. 9 is a lens cross-sectional diagram of a lens of Example 5 in Fifth Embodiment.
Figure 10:
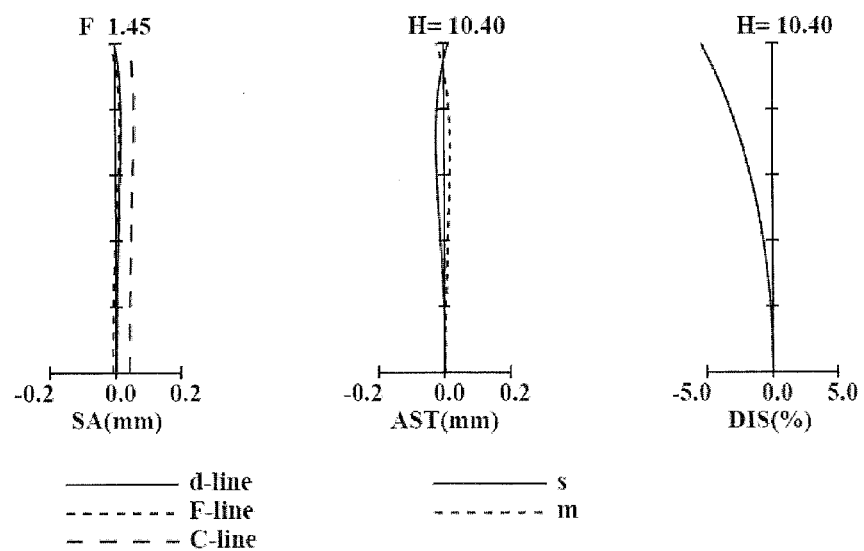
FIG. 10 is a longitudinal aberration diagram at the time of infinity focusing of the lens of Example 5.

FIG. 9 shows a lens configuration at the time of focusing on an object point at infinity of an inner focus lens according to Fifth Embodiment.

In the inner focus lens according to Fifth Embodiment, a first lens group G1, an aperture diaphragm A, and a second lens group G2 are arrayed in order from an object side to an image surface side.

In the inner focus lens according to Fifth Embodiment, the first lens group G1 consists of a first lens element L1 in a positive meniscus shape with a convex surface directed to the object side, a second lens element L2 in a positive meniscus shape with a convex surface directed to the object side, a third lens element L3 in a negative meniscus shape with a convex surface directed to the object side, a fourth lens element L4 in a biconcave shape, and a fifth lens element L5 in a biconvex shape in order from the object side to the image surface side. Here, the first lens element L1, the second lens element L2, and the third lens element L3 make up a first sub-lens group in the first lens group G1, and the fourth lens element L4 and the fifth lens element L5 make up a second sub-lens group. Among these, the fourth lens element L4 and the fifth lens element L5 are joined.

In the inner focus lens according to Fifth Embodiment, the second lens group G2 consists of a sixth lens element L6 in a biconvex shape, a seventh lens element L7 in a negative meniscus shape with a convex surface directed to the object side, an eighth lens element L8 in a biconvex shape, a ninth lens element L9 in a biconcave shape, a tenth lens element L10 in a biconvex shape, an eleventh lens element L11 in a positive meniscus shape with a convex surface directed to the image surface side, and a twelfth lens element L12 in a negative meniscus shape with a convex surface directed to the image surface side. Among these, the ninth lens element L9 and the tenth lens element L10 are joined. Moreover, the negative single lens L7 in the second lens group G2 is moved to the image surface side on an optical axis to thereby perform focusing from a side of an object at infinity to a side of an object at close range, and the positive single lens L8 is moved to a direction orthogonal to the optical axis to thereby correct image point movement by vibration of the whole system, that is, to optically correct image shaking due to hand shaking, vibration or the like.

Figure 11:
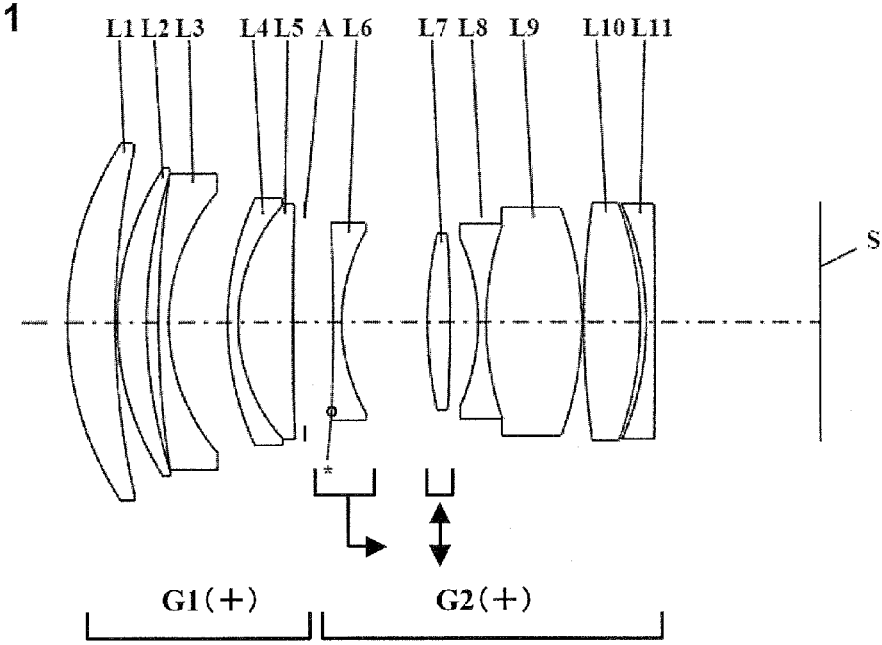
FIG. 11 is a lens cross-sectional diagram of a lens of Example 6 in Sixth Embodiment.
Figure 12:
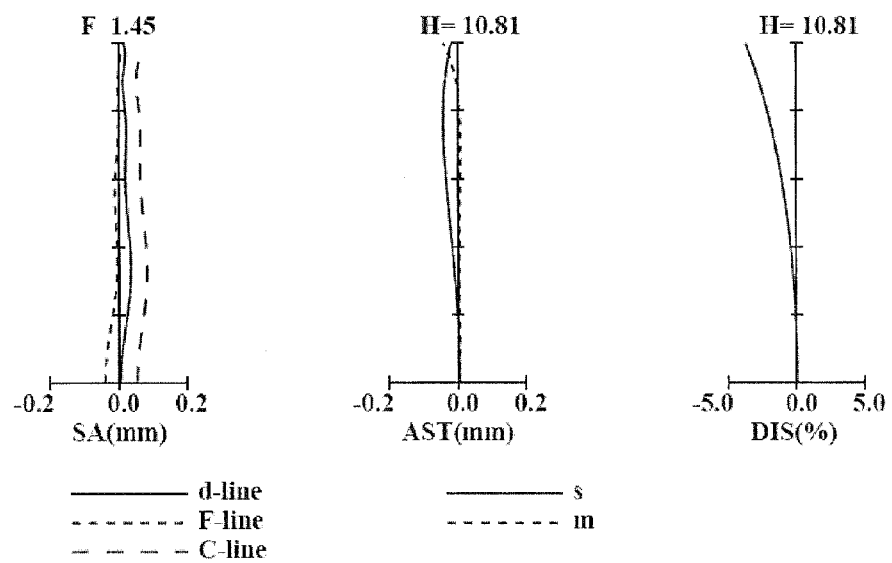
FIG. 12 is a longitudinal aberration diagram at the time of infinity focusing of the lens of Example 6.

FIG. 11 shows a lens configuration at the time of focusing on an object point at infinity of an inner focus lens according to Sixth Embodiment.

In the inner focus lens according to Sixth Embodiment, a first lens group G1, an aperture diaphragm A, and a second lens group G2 are arrayed in order from an object side to an image surface side.

In the inner focus lens according to Sixth Embodiment, the first lens group G1 consists of a first lens element L1 in a positive meniscus shape with a convex surface directed to the object side, a second lens element L2 in a positive meniscus shape with a convex surface directed to the object side, a third lens element L3 in a negative meniscus shape with a convex surface directed to the object side, a fourth lens element L4 in a negative meniscus shape with a convex surface directed to the object side, and a fifth lens element L5 in a positive meniscus shape with a convex surface directed to the object side in order from the object side to the image surface side. Here, the first lens element L1, the second lens element L2, and the third lens element L3 make up a first sub-lens group in the first lens group G1, and the fourth lens element L4 and the fifth lens element L5 make up a second sub-lens group. Among these, the fourth lens element L4 and the fifth lens element L5 are joined.

In the inner focus lens according to Sixth Embodiment, the second lens group G2 consists of a sixth lens element L6 in a biconcave shape, a seventh lens element L7 in a biconvex shape, an eighth lens element L8 in a biconcave shape, a ninth lens element L9 in a biconvex shape, a tenth lens element L10 in a biconvex shape, and an eleventh lens element L11 in a negative meniscus shape with a convex surface directed to the image surface side. Among these, the eighth lens element L8 and the ninth lens element L9 are joined. In the sixth lens element L6, an object-side surface thereof is aspherical. Moreover, the negative single lens L6 in the second lens group G2 is moved to the image surface side on an optical axis to thereby perform focusing from a side of an object at infinity to a side of an object at close range, and the positive single lens L7 is moved to a direction orthogonal to the optical axis to thereby correct image point movement by vibration of the whole system, that is, to optically correct image shaking due to hand shaking, vibration or the like.

Figure 13:
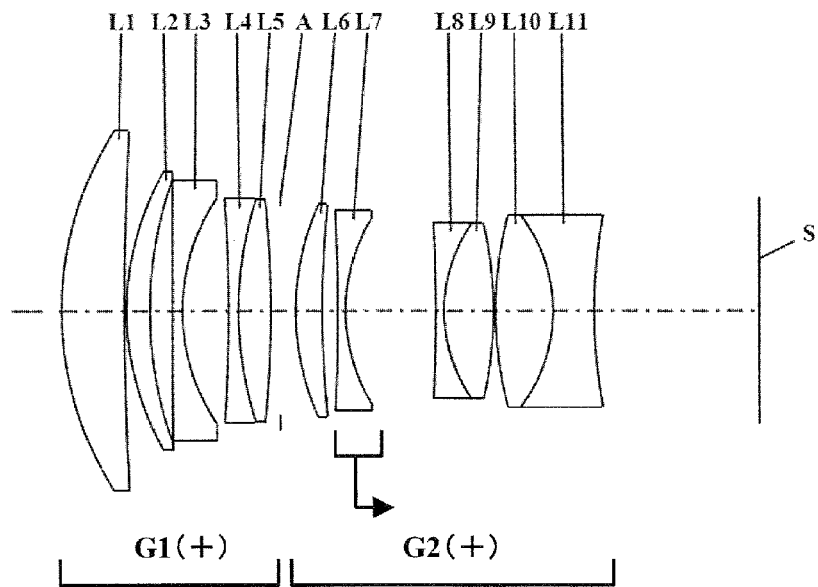
FIG. 13 is a lens cross-sectional diagram of a lens of Example 7 in Seventh Embodiment.
Figure 14:
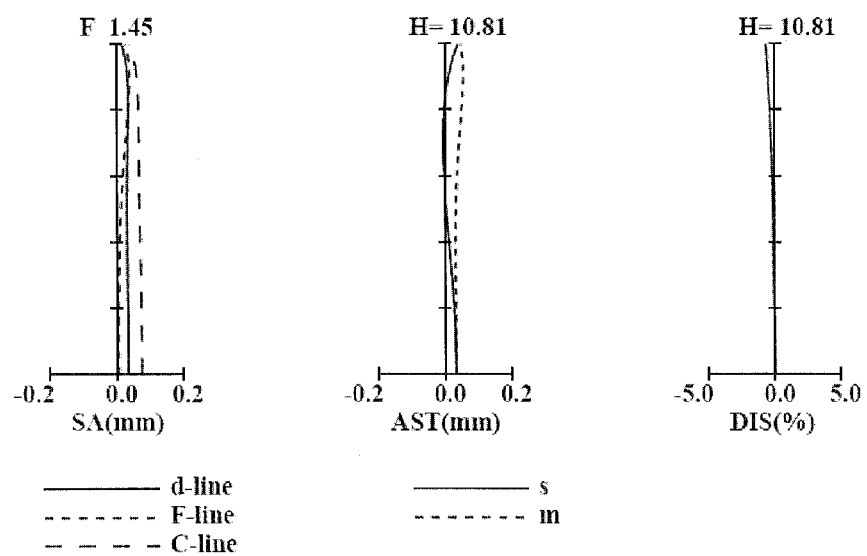
FIG. 14 is a longitudinal aberration diagram at the time of infinity focusing of the lens of Example 7.

FIG. 13 shows a lens configuration at the time of focusing on an object point at infinity of an inner focus lens according to Seventh Embodiment.

In the inner focus lens according to Seventh Embodiment, a first lens group G1, an aperture diaphragm A, and a second lens group G2 are arrayed in order from an object side to an image surface side.

In the inner focus lens according to Seventh Embodiment, the first lens group G1 consists of a first lens element L1 in a positive meniscus shape with a convex surface directed to the object side, a second lens element L2 in a positive meniscus shape with a convex surface directed to the object side, a third lens element L3 in a negative meniscus shape with a convex surface directed to the object side, a fourth lens element L4 in a biconcave shape, and a fifth lens element L5 in a biconvex shape in order from the object side to the image surface side. Here, the first lens element L1, the second lens element L2, and the third lens element L3 make up a first sub-lens group in the first lens group G1, and the fourth lens element L4 and the fifth lens element L5 make up a second sub-lens group. Among these, the fourth lens element L4 and the fifth lens element L5 are joined.

In the inner focus lens according to Seventh Embodiment, the second lens group G2 consists of a sixth lens element L6 in a positive meniscus shape with a convex surface directed to the object side, a seventh lens element L7 in a biconcave shape, an eighth lens element L8 in a biconcave shape, a ninth lens element L9 in a biconvex shape, a tenth lens element L10 in a biconvex shape, and an eleventh lens element L11 in a biconcave shape. Among these, the eighth lens element L8 and the ninth lens element L9 are joined, and the tenth lens element L10 and the eleventh lens element L11 are joined. Moreover, the negative single lens L7 in the second lens group G2 is moved to the image surface side on an optical axis to thereby perform focusing from a side of an object at infinity to a side of an object at close range.

Figure 15:
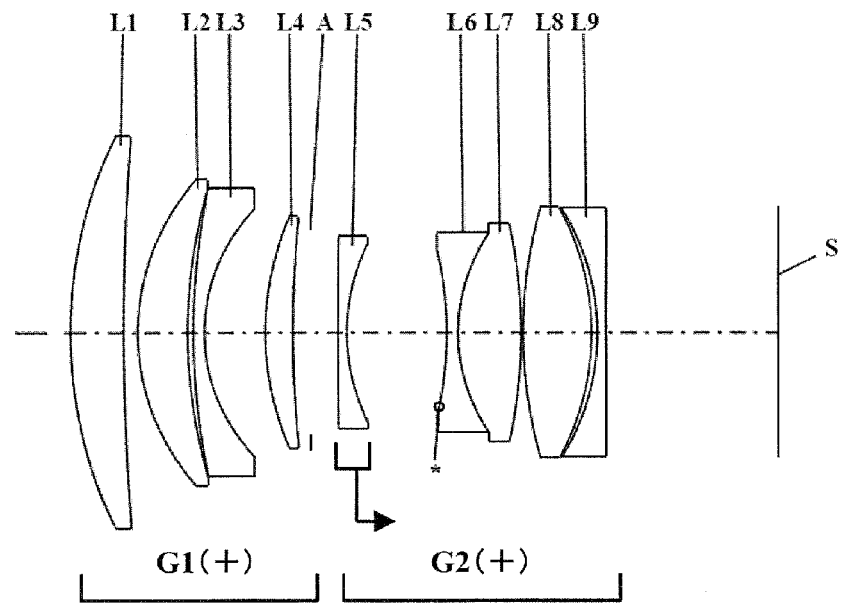
FIG. 15 is a lens cross-sectional diagram of a lens of Example 8 in Eighth Embodiment.
Figure 16:
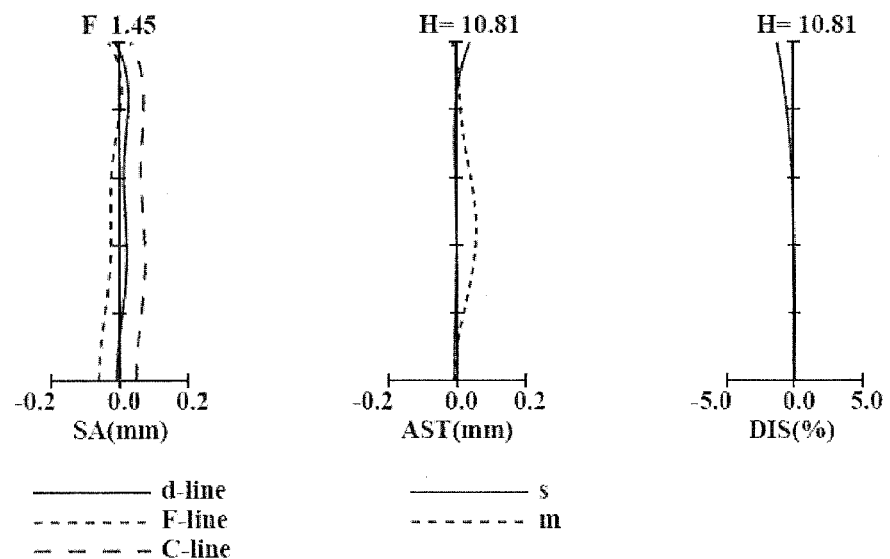
FIG. 16 is a longitudinal aberration diagram at the time of infinity focusing of the lens of Example 8.

FIG. 15 shows a lens configuration at the time of focusing on an object point at infinity of an inner focus lens according to Eighth Embodiment.

In the inner focus lens according to Eighth Embodiment, a first lens group G1, an aperture diaphragm A, and a second lens group G2 are arrayed in order from an object side to an image surface side.

In the inner focus lens according to Eighth Embodiment, the first lens group G1 consists of a first lens element L1 in a positive meniscus shape with a convex surface directed to the object side, a second lens element L2 in a positive meniscus shape with a convex surface directed to the object side, a third lens element L3 in a negative meniscus shape with a convex surface directed to the object side, and a fourth lens element L4 in a positive meniscus shape with a convex surface directed to the object side in order from the object side to the image surface side. Here, the first lens element L1, the second lens element L2, and the third lens element L3 make up a first sub-lens group in the first lens group G1, and the fourth lens element L4 makes up a second sub-lens group.

In the inner focus lens according to Eighth Embodiment, the second lens group G2 consists of a fifth lens element L5 in a negative meniscus shape with a convex surface directed to the object side, a sixth lens element L6 in a biconcave shape, a seventh lens element L7 in a biconvex shape, an eighth lens element L8 in a biconvex shape, and a ninth lens element L9 in a negative meniscus shape with a convex surface directed to the image surface side. Among these, the sixth lens element L6 and the seventh lens element L7 are joined. Moreover, the negative single lens L5 in the second lens group G2 is moved to the image surface side on an optical axis to thereby perform focusing from a side of an object at infinity to a side of an object at close range.

Figure 17:
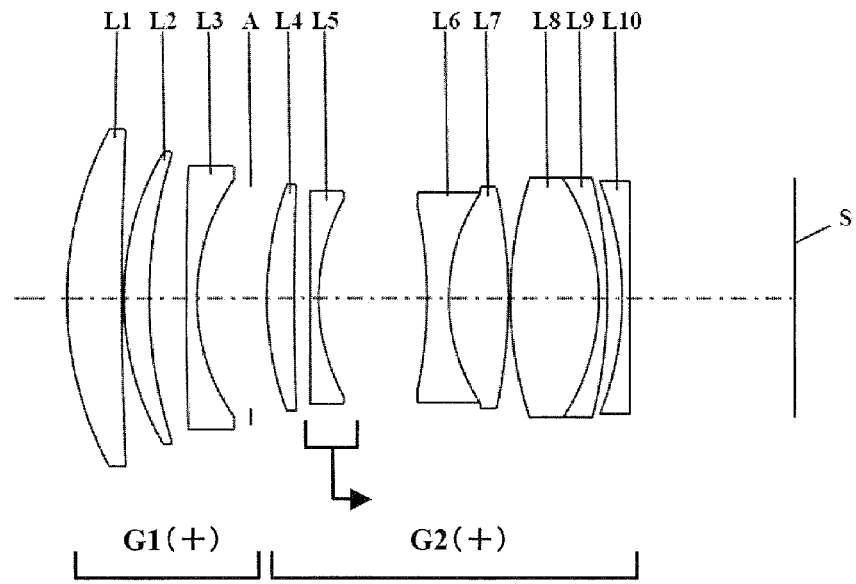
FIG. 17 is a lens cross-sectional diagram of a lens of Example 9 in Ninth Embodiment.
Figure 18:
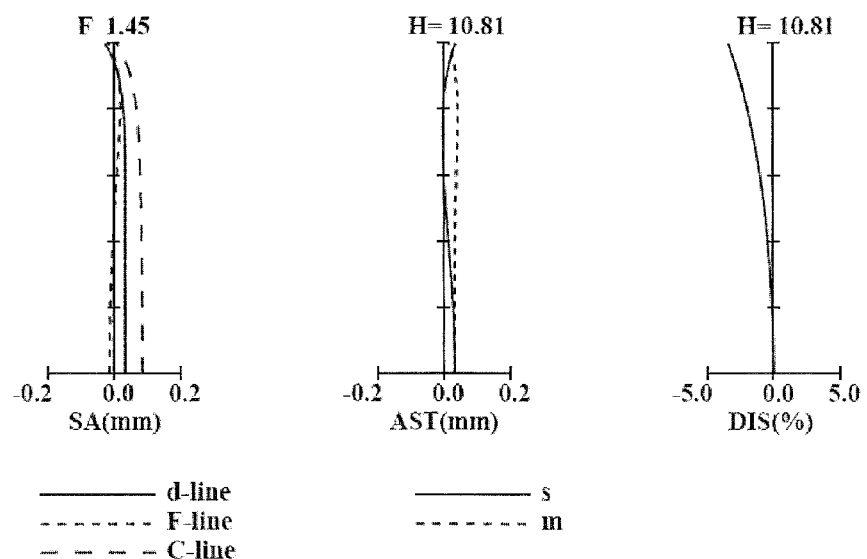
FIG. 18 is a longitudinal aberration diagram at the time of infinity focusing of the lens of Example 9.

FIG. 17 shows a lens configuration at the time of focusing on an object point at infinity of an inner focus lens according to Ninth Embodiment.

In the inner focus lens according to Ninth Embodiment, a first lens group G1, an aperture diaphragm A, and a second lens group G2 are arrayed in order from an object side to an image surface side.

In the inner focus lens according to Ninth Embodiment, the first lens group G1 is made up of a first lens element L1 in a positive meniscus shape with a convex surface directed to the object side, a second lens element L2 in a positive meniscus shape with a convex surface directed to the object side, and a third lens element L3 in a negative meniscus shape with a convex surface directed to the object side, in order from the object side to the image surface side. In this manner, in Ninth Embodiment, the first lens group G1 is made up of only a first sub-lens group.

In the inner focus lens according to Ninth Embodiment, the second lens group G2 consists of a fourth lens element L4 in a positive meniscus shape with a convex surface directed to the object side, a fifth lens element L5 in a biconcave shape, a sixth lens element L6 in a biconcave shape, a seventh lens element L7 in a biconvex shape, an eighth lens element L8 in a biconvex shape, a ninth lens element L9 in a negative meniscus shape with a convex surface directed to the image surface side, and a tenth lens element L10 in a negative meniscus shape with a convex surface directed to the image surface side. Among these, the sixth lens element L6 and the seventh lens element L7 are joined, and the eighth lens element L8 and the ninth lens element L9 are joined. Moreover, the negative single lens L5 in the second lens group G2 is moved to the image surface side on an optical axis to thereby perform focusing from a side of an object at infinity to a side of an object at close range.

Hereinafter, conditions that the lens systems according to, for example, First to Ninth Embodiments beneficially satisfy will be described. A plurality of illustrative conditions are defined for the lens system according to each of the embodiments, and a configuration of the lens system satisfying all the plurality of conditions is the most beneficial. However, satisfying the individual condition also enables the lens system exerting a corresponding effect to be obtained.

The inner focus lens in each of the present embodiments is made up of the first lens group, the aperture diaphragm, and the second lens group in order from the object side, and the first lens group has the first sub-lens group on a side closest to the object, and the first sub-lens group has the first lens element having positive power, the second lens element having positive power, the third lens element having negative power, or has the first lens element having positive power, the second lens element having positive power, the third lens element having positive power, and the fourth lens element having negative power, wherein one lens element in the second lens group is moved with respect to the image surface in the focusing from the infinity focusing state to the close range focusing state.

In this lens configuration, in the first lens group, in order from the object side, the first sub-lens group consisting of the two or three positive lenses and the one negative lens is arranged. This allows the aberration to be beneficially corrected while obtaining a high light flux converging action.

In this lens configuration, the single lens having negative refractive power in the second lens group is arranged as the focus lens. This enables the lightweight focus lens to be attained, and high-speed focusing to be achieved by focus drive using an autofocus mechanism by electric lens drive.

In this lens configuration, the second lens group has the five or more lens elements. This allows field curvature by the focusing to be beneficially corrected.

Moreover, this lens configuration has the one negative lens and the two positive lenses in the second lens group in order from the object side. This allows the aberration occurring in the first sub-lens group to be beneficially corrected.

The inner focus lens in each of the present embodiments beneficially satisfies the following condition expression (1).

$$nd1>1.75 \tag{1}$$

where nd1: a refractive index of the first lens element.

The condition expression (1) is a condition expression regarding the refractive index of the first lens element with respect to a d-line of the first lens element. When the refractive index falls below a lower limit value of the condition expression (1), a curvature of the first lens element becomes larger, which makes the correction of spherical aberration difficult, so that demand for the enlarged diameter of the lens system cannot be met.

Furthermore, satisfying the following condition (1)' allows the above-described effect to be further exerted.

$$nd1>1.85 \tag{1)'}$$

Furthermore, satisfying the following condition (1)'' allows the above-described effect to be further exerted.

$$nd1>1.95 \tag{1)''}$$

The inner focus lens in each of the present embodiments beneficially satisfies the following condition expression (2).

$$0.95<DLA/D1S<3.0 \tag{2}$$

where

DLA: a summation of thicknesses on the optical axis of the lens elements making up the lens system D1S: a distance on the optical axis from an object-side surface of the first lens element to the aperture diaphragm.

The condition expression (2) is a condition expression defining a ratio between the summation of the thicknesses on the optical axis of the lens elements making up the lens system, and the distance on the optical axis from the object-side surface of the first lens element to the aperture diaphragm. When the ratio falls below a lower limit of the condition expression (2), the thicknesses of the lens elements making up the lens system become too short, so that the demand for the enlarged diameter of the lens system cannot be met. When the ratio exceeds an upper limit of the condition expression (2), a diaphragm diameter becomes large, thereby increasing the lens system in size.

Furthermore, satisfying the following condition (2)' allows the above-described effect to be further exerted.

$$1.2<DLA/D1S<2.8 \tag{2)'}$$

The inner focus lens in each of the present embodiments beneficially satisfies the following condition expression (3).

$$vds>55 \tag{3}$$

where vds: an Abbe number of the focus lens.

The condition expression (3) is a condition expression regarding the Abbe number of the focus lens. When the Abbe number falls below a lower limit of the condition expression (3), the correction of magnification chromatic aberration accompanying the focusing becomes difficult.

Furthermore, satisfying the following condition expression (3)' allows the above-described effect to be further exerted.

$$vds>65 \tag{3)'}$$

The inner focus lens in each of the present embodiments beneficially satisfies the following condition expression (4).

$$0.8<|L/fF|<3.5 \tag{4}$$

where

L: a whole optical length in the lens system fF: a focal distance of the focus lens.

The condition expression (4) is a condition expression defining a ratio between the whole optical length in the lens system, and the focal distance of the focus lens. When the ratio falls below a lower limit of the condition expression (4), the refractive power of the focus lens becomes weaker, thereby increasing the focus movement amount. This makes high-speed focusing and downsizing of the lens system difficult. When the ratio exceeds an upper limit of the condition expression (4), the whole optical length in the lens system becomes long, so that the downsizing of the lens system becomes difficult.

Furthermore, satisfying the following condition (4)' allows the above-described effect to be further exerted.

$$1.0<|L/fF|<3.0 \tag{4)'}$$

In the inner focus lens in each of the present embodiments, each of the lens elements making up the first sub-lens group is beneficially made up of only a single lens element. When joined lenses are included in the first sub-lens group, the correction of the spherical aberration becomes difficult, and the enlarged diameter of the lens system becomes difficult.

In the inner focus lens in each of the present embodiments, a second lens element from the image surface side in the first sub-lens group is beneficially a positive meniscus lens with a convex shape to the object side. When the foregoing is not satisfied, the correction of coma aberration becomes difficult, which makes it difficult to obtain beneficial aberration performance.

In the inner focus lens in each of the present embodiments, the lens element closest to the image surface in the second lens group beneficially has a concave surface to the object side. When the foregoing is not satisfied, a ray incident angle to the lens element closest to the image surface in the second lens group becomes large, so that the correction of coma aberration becomes difficult, which makes it difficult to obtain beneficial aberration performance.

In the inner focus lens in each of the present embodiments, the lens element closest to the image surface in the second lens group beneficially has negative power. When the foregoing is not satisfied, the power of the positive lenses in the second lens group becomes weak, thereby increasing the incident ray to the image surface, which makes it difficult to sufficiently exert light condensing performance of a microlens provided in front of a solid-state image pickup device.

The inner focus lens in each of the present embodiments beneficially satisfies the following condition expression (5).

$$(R11+R12)/(R11-R12) < -1.0 \quad (5)$$

where

R11: a curvature radius of the object side surface of the first lens element, and R12: a curvature radius of an image-surface side surface of the first lens element.

The condition expression (5) is a condition defining a relationship between the curvature radius of the object side surface of the first lens element and the curvature radius of the image-surface side surface of the first lens element. When the value exceeds an upper limit of the condition (5), the ray incident angle to the image-surface side surface of the first lens element becomes large, which makes it difficult to beneficially correct the coma aberration.

Furthermore, satisfying the following condition (5)' allows the above-described effect to be further exerted.

$$-3.0 < (R11+R12)/(R11-R12) < -1.2 \quad (5)'$$

While the respective lens groups of each of the inner focus lenses according to the First to Ninth Embodiments are each made up of only refractive lens elements that polarize incident ray by refraction (i.e., lens elements of a type in which polarization is performed at an interface between media having different refractive indexes), the present disclosure is not limited thereto. For example, the lens groups may be each made up of diffractive lens elements that polarize incident ray by diffraction, refractive/diffractive hybrid type lens elements that polarize the incident ray in combination with a diffractive action and a refractive action, gradient index lens elements that polarize the incident ray by refractive-index distribution inside the medium, or the like. Particularly, the refractive/diffractive hybrid type lens elements are beneficial, because forming a diffractive structure on the interface of the media with different refractive index improves wavelength dependency of diffraction efficiency.

Tenth Embodiment

Figure 19:
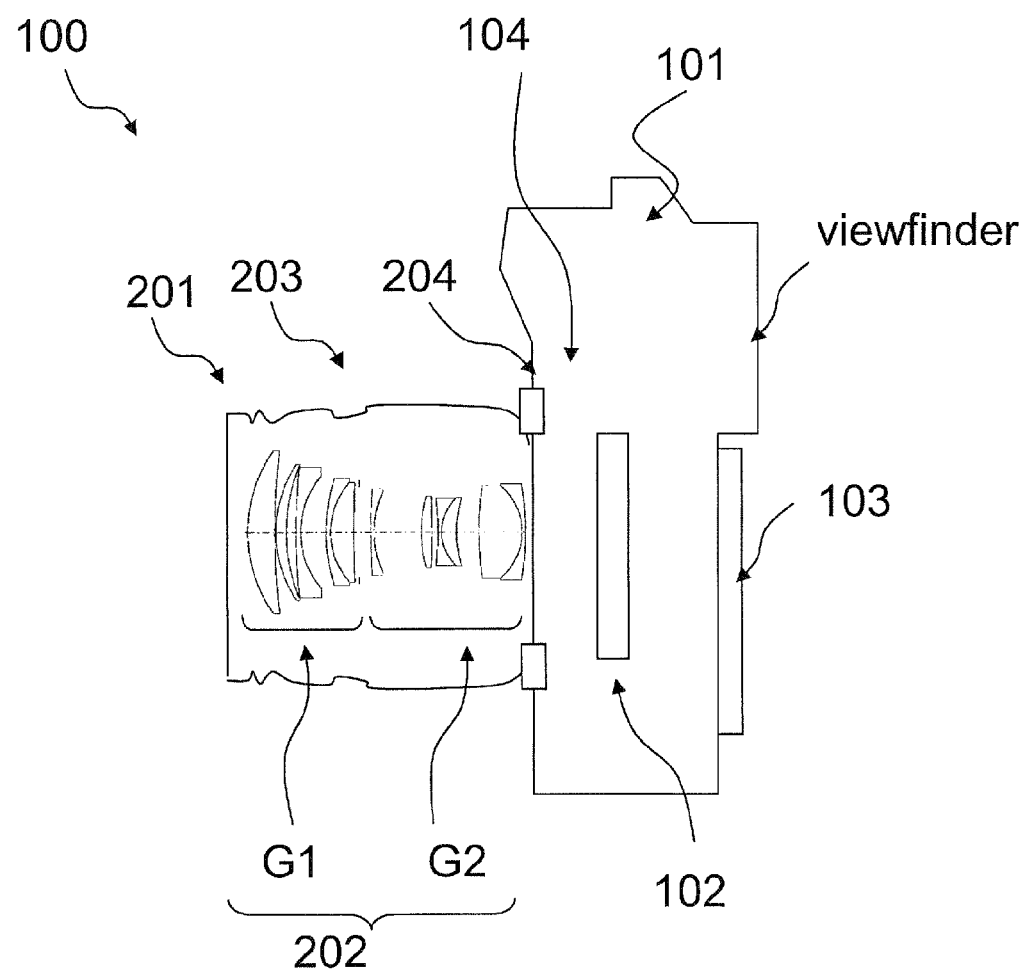
FIG. 19 is a schematic configuration diagram of an interchangeable-lens type digital camera system according to Tenth Embodiment.

FIG. 19 is a schematic configuration diagram of an interchangeable-lens type digital camera system according to Tenth Embodiment.

The interchangeable-lens type digital camera system 100 according to Tenth Embodiment includes a camera body 101, an interchangeable lens device 201 detachably connected to the camera body 101.

The camera body 101 includes an image pickup device 102 that receives an optical image formed by an inner focus lens 202 in the interchangeable lens device 201 to convert the optical image to an electric image signal, a liquid crystal monitor 103 that displays the image signal converted by the image pickup device 102, and a camera mounting portion 104. On the other hand, the interchangeable lens device 201 includes the inner focus lens 202 according to any one of the First to Ninth Embodiments, a lens barrel 203 holding the inner focus lens 202, and a lens mounting portion 204 connected to the camera mounting portion 104 of the camera body. The camera mounting portion 104 and the lens mounting portion 204 not only physically connects, but also electrically connects a controller (not shown) inside the camera body 101 and a controller (not shown) inside the interchangeable lens device 201 to serve as an interface enabling exchange of mutual signals. In FIG. 19, a case is illustrated where the inner focus lens according to the First Embodiment is used as the inner focus lens 202.

In Tenth Embodiment, since the inner focus lens 202 according to any one of the First to Ninth Embodiments is used, the compact interchangeable lens device excellent in image formation performance can be realized at a low cost. Moreover, the downsizing and the low cost of the whole camera system 100 according to Tenth Embodiment can be achieved.

Hereinafter, numerical value examples in which the inner focus lenses according to the First to Ninth Embodiments were specifically carried out will be described. In the respective numerical value examples, a unit of length in tables is "mm", and a unit of angle of view is "°". Moreover, in the respective numerical value examples, r denotes a curvature radius, d denotes a surface separation, nd denotes a refractive index with respect to the d-line, and vd is an Abbe number with respect to the d-line. In the respective numerical value examples, a surface given sign * is aspherical, and an aspherical shape is defined by the following expression.

$$Z = \frac{h^2/r}{1+\sqrt{1-(1+k)(h/r)^2}} + \sum A_n h^n$$

where z is a distance from a point on an aspherical surface at a height h from the optical axis to a tangent plane at a vertex of the aspherical surface, h is the height from the optical axis, r is a curvature radius of the vertex, κ is a conic constant, and An is an n-order aspherical coefficient.

FIGS. 2, 4, 6, 8, 10, 12, 14, 16 and 18 are longitudinal aberration diagrams at the time of infinity focusing of the inner focus lenses according to the First to Ninth Embodiments.

Each of the longitudinal aberration diagrams shows spherical aberration (SA (mm)), astigmatism (AST (mm)), and distortion (DIS (%)) in order from left. In the spherical aberration diagram, a vertical axis indicates an F-number (in the figures, indicated by F), a solid line indicates characteristics of a d-line, a short dashed line indicates characteristics of an F-line, and a long dashed line indicates characteristics of a C-line. In the astigmatism diagram, a vertical line indicates an image height (in the figures, indicated by H), a solid line indicates characteristics of a sagittal plane (in the figures, indicated by s), a dashed line indicates characteristics of a meridional plane (in the figures, indicated by m). In the distortion diagram, a vertical axis indicates an image height (in the figures, indicated by H).

Numerical Value Example 1

TABLE 1

Surface data

| Surface No. | r | d | nd | vd |
|---|---|---|---|---|
| Object surface | ∞ | | | |
| 1 | 32.54910 | 6.11400 | 2.00100 | 29.1 |
| 2 | 161.27730 | 0.20000 | | |
| 3 | 27.13830 | 2.44150 | 1.834181 | 42.1 |
| 4 | 38.82580 | 2.25400 | | |
| 5 | 153.19860 | 1.00000 | 1.76182 | 26.6 |
| 6 | 19.77850 | 5.71560 | | |
| 7 | 40.54160 | 1.00000 | 1.84666 | 23.8 |
| 8 | 17.11630 | 5.24220 | 1.72916 | 54.7 |
| 9 | 312.37060 | 1.19520 | | |
| 10 (Diaphragm) | ∞ | 2.50048 | | |
| 11 | 145.12920 | 0.80000 | 1.59349 | 67.0 |
| 12 | 22.11130 | 10.53882 | | |
| 13 | 29.27420 | 2.36820 | 1.80420 | 46.5 |
| 14 | −183.90650 | 1.41280 | | |
| 15 | −68.72480 | 0.80000 | 1.78472 | 25.7 |
| 16 | 10.97290 | 3.20520 | 1.72916 | 54.7 |
| 17 | 26.66160 | 5.05990 | | |
| 18 | 73.06160 | 9.68850 | 2.00069 | 25.5 |
| 19 | −13.63610 | 0.80000 | 1.88300 | 40.8 |
| 20 | −65.35500 | BF | | |
| Image surface | ∞ | | | |

Various types of data

| | |
|---|---|
| Focal distance | 63.9925 |
| F-number | 1.84985 |
| Angle of view | 9.5274 |
| Image height | 10.8150 |
| Whole lens length | 80.0052 |
| BF | 17.66880 |

Numerical Value Example 2

TABLE 2

Surface data

| Surface No. | r | d | nd | vd |
|---|---|---|---|---|
| Object surface | ∞ | | | |
| 1 | 28.88080 | 3.79350 | 2.00100 | 29.1 |
| 2 | 122.05400 | 0.20000 | | |
| 3 | 23.43050 | 1.76680 | 2.00100 | 29.1 |
| 4 | 31.58880 | 1.62190 | | |
| 5 | 172.64040 | 1.00000 | 1.69895 | 30.0 |
| 6 | 10.75220 | 6.40810 | | |
| 7 (Diaphragm) | ∞ | 3.38120 | | |
| 8 | −18.92510 | 1.00000 | 1.75211 | 25.0 |
| 9 | 19.95910 | 6.73210 | 1.80420 | 46.5 |
| 10 | −23.57860 | 0.10000 | | |
| 11 | 41.83690 | 3.01210 | 2.00100 | 29.1 |
| 12 | −101.47820 | 1.49428 | | |
| 13* | 51.29910 | 0.80000 | 1.81000 | 41.0 |
| 14 | 23.40330 | 7.97052 | | |
| 15* | 36.08980 | 7.10940 | 1.61881 | 63.9 |
| 16* | −17.96920 | 2.00000 | | |
| 17 | −28.01840 | 1.00000 | 1.69895 | 30.0 |
| 18 | −204.91690 | BF | | |
| Image surface | ∞ | | | |

Aspherical surface data

Thirteenth surface

K = 0.00000E+00, A4 = −1.48215E−05, A6 = 1.08337E−07,
A8 = −1.73336E−09, A10 = 1.44331E−11, A4 = −5.03972E−14,
A14 = 0.00000E+00

TABLE 2-continued

Surface data

| Surface No. | r | d | nd | vd |
|---|---|---|---|---|

Fifteenth surface

K = 0.00000E+00, A4 = 1.95901E−05, A6 = −1.39021E−07,
A8 = 2.45365E−09, A10 = −2.62567E−11, A12 = 1.43841E−13,
A14 = −2.86631E−16

Sixteenth surface

K = 0.00000E+00, A4 = 5.69722E−05, A6 = −3.03355E−07,
A8 = 5.72608E−09, A10 = −5.64188E−11, A12 = 2.91697E−13,
A14 = −5.72392E−16

Various types of data

| | |
|---|---|
| Focal distance | 26.0008 |
| F-number | 1.45112 |
| Angle of view | 22.9316 |
| Image height | 10.6000 |
| Whole lens length | 65.0823 |
| BF | 15.69242 |

Numerical Value Example 3

TABLE 3

Surface data

| Surface No. | r | d | nd | vd |
|---|---|---|---|---|
| Object surface | ∞ | | | |
| 1 | 131.85730 | 2.74950 | 1.83481 | 42.7 |
| 2 | 325.75830 | 0.20000 | | |
| 3 | 40.98420 | 9.98600 | 1.49700 | 81.6 |
| 4 | −2502.42530 | 0.20000 | | |
| 5 | 35.58140 | 5.58160 | 1.59282 | 68.6 |
| 6 | 100.76590 | 2.04400 | | |
| 7 | 401.81000 | 1.00000 | 1.59551 | 39.2 |
| 8 | 51.92160 | 5.81630 | | |
| 9 | 39.58280 | 1.00000 | 1.88300 | 40.8 |
| 10 | 16.79030 | 6.76930 | 1.49700 | 81.6 |
| 11 | 81.90260 | 1.96930 | | |
| 12 (Diaphragm) | ∞ | 2.50120 | | |
| 13 | 8214.66960 | 1.00000 | 1.48749 | 70.4 |
| 14 | 22.88700 | 11.42720 | | |
| 15 | 28.34740 | 0.80000 | 1.84666 | 23.8 |
| 16 | 14.39120 | 1.65810 | 1.80420 | 46.5 |
| 17 | 20.56290 | 11.40350 | | |
| 18 | 147.60390 | 5.51730 | 1.90366 | 31.3 |
| 19 | −14.88540 | 0.80000 | 1.80450 | 39.6 |
| 20 | −73.57160 | 0.00000 | | |
| 21 | ∞ | BF | | |
| Image surface | ∞ | | | |

Various types of data

| | |
|---|---|
| Focal distance | 99.9981 |
| F-number | 2.08603 |
| Angle of view | 5.9920 |
| Image height | 10.8150 |
| Whole lens length | 95.0180 |
| BF | 22.59472 |

Numerical Value Example 4

TABLE 4

Surface data

| Surface No. | r | d | nd | vd |
|---|---|---|---|---|
| Object surface | ∞ | | | |
| 1 | 51.26590 | 2.14990 | 1.88300 | 40.8 |
| 2 | −255.09970 | 0.20000 | | |
| 3 | 24.24030 | 2.16860 | 1.80420 | 46.5 |
| 4 | 69.59590 | 0.91040 | | |
| 5 | −153.69520 | 1.00000 | 1.75211 | 25.0 |
| 6 | 23.83180 | 3.15760 | | |
| 7 (Diaphragm) | ∞ | 1.51990 | | |
| 8 | −1825.53310 | 1.00000 | 1.72825 | 28.3 |
| 9 | 28.19590 | 2.69040 | 2.00100 | 29.1 |
| 10 | −74.63950 | 1.43648 | | |
| 11 | 319.65950 | 0.80000 | 1.48749 | 70.4 |
| 12 | 17.44720 | 10.58202 | | |
| 13 | −26.14210 | 0.80000 | 1.72825 | 28.3 |
| 14 | 34.58310 | 5.70050 | 1.80420 | 46.5 |
| 15 | −23.85240 | 0.20000 | | |
| 16* | 24.24830 | 5.00350 | 1.80139 | 45.4 |
| 17 | −53.46230 | 1.00000 | 1.61293 | 37.0 |
| 18 | 30.43930 | 0.00000 | | |
| 19 | ∞ | BF | | |
| Image surface | ∞ | | | |

Aspherical surface data

Sixteenth surface $K = 0.00000E+00$, $A4 = -9.72958E-06$, $A6 = 2.21314E-07$,
$A8 = -4.51113E-09$, $A10 = 5.08465E-11$, $A12 = -2.87774E-13$,
$A14 = 5.77607E-16$, $A16 = 4.42366E-19$ Various types of data

| Focal distance | 35.6706 |
|---|---|
| F-number | 1.85028 |
| Angle of view | 17.4387 |
| Image height | 10.8150 |
| Whole lens length | 57.9568 |
| BF | 17.63753 |

Numerical Value Example 5

TABLE 5

Surface data

| Surface No. | r | d | nd | vd |
|---|---|---|---|---|
| Object surface | ∞ | | | |
| 1 | 30.38110 | 6.92480 | 2.00100 | 29.1 |
| 2 | 131.83020 | 0.61950 | | |
| 3 | 24.64390 | 2.35910 | 1.80420 | 46.5 |
| 4 | 35.12280 | 2.26510 | | |
| 5 | 137.35750 | 1.00000 | 1.84666 | 23.8 |
| 6 | 16.55090 | 6.69740 | | |
| 7 | −29.78610 | 1.00000 | 1.75211 | 25.0 |
| 8 | 29.47920 | 4.56450 | 1.80420 | 46.5 |
| 9 | −48.13630 | 1.00000 | | |
| 10 (Diaphragm) | ∞ | 1.50000 | | |
| 11 | 54.19220 | 2.63370 | 2.00100 | 29.1 |
| 12 | −112.69560 | 1.50289 | | |
| 13 | 65.51040 | 0.80000 | 1.59349 | 67.0 |
| 14 | 20.57690 | 11.09441 | | |
| 15 | 32.68080 | 2.31320 | 1.80420 | 46.5 |
| 16 | −668.87830 | 2.56970 | | |
| 17 | −28.00680 | 4.75820 | 1.84666 | 23.8 |
| 18 | 40.91420 | 4.63690 | 2.00100 | 29.1 |
| 19 | −28.40300 | 0.20000 | | |
| 20 | −293.08450 | 1.95040 | 2.00100 | 29.1 |
| 21 | −44.20580 | 0.59010 | | |
| 22 | 31.15870 | 0.80000 | 1.75211 | 25.0 |
| 23 | −656.95580 | 0.00000 | | |
| 24 | ∞ | BF | | |
| Image surface | ∞ | | | |

Various types of data

| Focal distance | 43.5055 |
|---|---|
| F-number | 1.45010 |
| Angle of view | 14.8128 |
| Image height | 10.8150 |
| Whole lens length | 77.4806 |
| BF | 15.70072 |

Numerical Value Example 6

TABLE 6

Surface data

| Surface No. | r | d | nd | vd |
|---|---|---|---|---|
| Object surface | ∞ | | | |
| 1 | 30.76580 | 4.51490 | 2.00100 | 29.1 |
| 2 | 73.93420 | 0.23270 | | |
| 3 | 26.93920 | 2.72760 | 1.80420 | 46.5 |
| 4 | 45.50440 | 1.11490 | | |
| 5 | 88.92110 | 1.00000 | 1.76182 | 26.6 |
| 6 | 18.87610 | 5.54960 | | |
| 7 | 27.50520 | 1.00000 | 1.80518 | 25.5 |
| 8 | 16.55130 | 5.22050 | 1.72916 | 54.7 |
| 9 | 367.69000 | 1.15560 | | |
| 10 (Diaphragm) | ∞ | 2.70463 | | |
| 11* | −142.03430 | 0.80000 | 1.58913 | 61.3 |
| 12 | 17.18350 | 8.07317 | | |
| 13 | 38.62050 | 2.16640 | 1.80420 | 46.5 |
| 14 | −126.54620 | 2.59910 | | |
| 15 | −19.73710 | 0.80000 | 1.84666 | 23.8 |
| 16 | 27.48030 | 9.01570 | 2.00100 | 29.1 |
| 17 | −29.98210 | 0.20000 | | |
| 18 | 79.15070 | 5.36210 | 2.00100 | 29.1 |
| 19 | −31.08410 | 0.59310 | | |
| 20 | −27.44150 | 0.80000 | 1.84666 | 23.8 |
| 21 | −877.39280 | 0.00000 | | |
| 22 | ∞ | BF | | |
| Image surface | ∞ | | | |

Aspherical surface data

Eleventh surface $K = 0.00000E+00$, $A4 = 6.25132E-06$, $A6 = 5.05558E-07$,
$A8 = -1.70140E-08$, $A10 = 2.96783E-10$, $A12 = -2.58982E-12$,
$A14 = 8.90624E-15$ Various types of data

| Focal distance | 43.4936 |
|---|---|
| F-number | 1.45020 |
| Angle of view | 14.4921 |
| Image height | 10.8150 |
| Whole lens length | 71.3338 |
| BF | 15.70378 |

Numerical Value Example 7

TABLE 7

Surface data

| Surface No. | r | d | nd | vd |
|---|---|---|---|---|
| Object surface | ∞ | | | |
| 1 | 33.59090 | 6.26130 | 2.00100 | 29.1 |
| 2 | 338.91840 | 0.20000 | | |
| 3 | 27.84520 | 2.33710 | 1.77250 | 49.6 |
| 4 | 38.82370 | 2.28440 | | |
| 5 | 1983.09150 | 1.00000 | 1.80518 | 25.5 |
| 6 | 19.95950 | 4.67620 | | |
| 7 | −163.76710 | 1.00000 | 1.80518 | 25.5 |
| 8 | 35.75320 | 3.26840 | 1.80420 | 46.5 |
| 9 | −111.82390 | 1.00000 | | |
| 10 (Diaphragm) | ∞ | 1.50000 | | |
| 11 | 25.53280 | 2.71720 | 1.80420 | 46.5 |
| 12 | 102.45250 | 1.50541 | | |
| 13 | −224.32670 | 0.80000 | 1.48749 | 70.4 |
| 14 | 17.69120 | 9.02129 | | |
| 15 | −181.14080 | 0.80000 | 1.92286 | 20.9 |
| 16 | 15.57920 | 4.91030 | 1.80420 | 46.5 |
| 17 | −39.02770 | 0.20000 | | |
| 18 | 37.41270 | 5.78570 | 2.00272 | 19.3 |
| 19 | −15.69590 | 4.11670 | 1.84666 | 23.8 |
| 20 | 50.71110 | 0.00000 | | |
| 21 | ∞ | BF | | |
| Image surface | ∞ | | | |

Various types of data

| | |
|---|---|
| Focal distance | 43.7769 |
| F-number | 1.45075 |
| Angle of view | 13.9630 |
| Image height | 10.8150 |
| Whole lens length | 70.0019 |
| BF | 16.61791 |

Numerical Value Example 8

TABLE 8

Surface data

| Surface No. | r | d | nd | vd |
|---|---|---|---|---|
| Object surface | ∞ | | | |
| 1 | 40.64030 | 4.77060 | 1.80420 | 46.5 |
| 2 | 225.66910 | 1.29030 | | |
| 3 | 20.89960 | 4.44400 | 1.83481 | 42.7 |
| 4 | 47.29200 | 0.52050 | | |
| 5 | 63.70520 | 1.00000 | 1.75520 | 27.5 |
| 6 | 15.99260 | 5.53030 | | |
| 7 | 25.87670 | 2.52480 | 1.61800 | 63.4 |
| 8 | 99.97050 | 1.61740 | | |
| 9 (Diaphragm) | ∞ | 2.49561 | | |
| 10 | 642.92240 | 0.80000 | 1.61800 | 63.4 |
| 11 | 17.98080 | 9.02290 | | |
| 12* | −34.42390 | 1.00000 | 1.82115 | 24.1 |
| 13 | 16.31850 | 5.60150 | 1.83481 | 42.7 |
| 14 | −45.79610 | 0.20000 | | |
| 15 | 41.11280 | 6.19030 | 2.00100 | 29.1 |
| 16 | −23.13550 | 0.53060 | | |
| 17 | −20.93660 | 0.80000 | 1.62004 | 36.3 |
| 18 | ∞ | BF | | |
| Image surface | ∞ | | | |

Aspherical surface data

Twelfth surface

K = 0.00000E+00, A4 = −2.26917E−05, A6 = 1.02312E−06,
A8 = −4.79576E−08, A10 = 1.14319E−09, A12 = −1.37955E−11,
A14 = 6.58814E−14

TABLE 8-continued

Surface data

| Surface No. | r | d | nd | vd |
|---|---|---|---|---|

Various types of data

| | |
|---|---|
| Focal distance | 43.5023 |
| F-number | 1.45008 |
| Angle of view | 14.1364 |
| Image height | 10.8150 |
| Whole lens length | 64.0298 |
| BF | 15.69099 |

Numerical Value Example 9

TABLE 9

Surface data

| Surface No. | r | d | nd | vd |
|---|---|---|---|---|
| Object surface | ∞ | | | |
| 1 | 33.39030 | 5.19130 | 1.80420 | 46.5 |
| 2 | 336.48570 | 0.20000 | | |
| 3 | 27.46550 | 2.39690 | 1.80420 | 46.5 |
| 4 | 45.05370 | 3.43270 | | |
| 5 | 370.65770 | 1.00000 | 1.75520 | 27.5 |
| 6 | 19.70600 | 5.09640 | | |
| 7 (Diaphragm) | ∞ | 1.50000 | | |
| 8 | 31.22280 | 2.61470 | 1.80420 | 46.5 |
| 9 | 306.00770 | 1.49921 | | |
| 10 | −3611.98130 | 0.80000 | 1.48749 | 70.4 |
| 11 | 19.16640 | 10.38299 | | |
| 12 | −41.64120 | 2.05100 | 1.76182 | 26.6 |
| 13 | 18.48890 | 5.57750 | 1.77250 | 49.6 |
| 14 | −48.36060 | 0.20000 | | |
| 15 | 36.75840 | 8.32720 | 2.00100 | 29.1 |
| 16 | −20.41970 | 0.80000 | 1.80610 | 33.3 |
| 17 | −45.57790 | 1.41010 | | |
| 18 | −29.33940 | 0.80000 | 1.76182 | 26.6 |
| 19 | ∞ | BF | | |
| Image surface | ∞ | | | |

Various types of data

| | |
|---|---|
| Focal distance | 43.5117 |
| F-number | 1.45044 |
| Angle of view | 14.4311 |
| Image height | 10.8150 |
| Whole lens length | 69.0123 |
| BF | 15.73229 |

In table 10, values corresponding to the respective conditions in the lens systems of the respective numerical value examples are shown.

TABLE 10

| | Example 1 | Example 2 | Example 3 | Example 4 | Example 5 |
|---|---|---|---|---|---|
| (1) | 2.00 | 2.00 | 1.83 | 1.88 | 2.00 |
| (2) | 1.33 | 1.77 | 0.99 | 2.33 | 1.28 |
| (3) | 67.0 | 41.0 | 70.4 | 70.4 | 67.0 |
| (4) | 1.82 | 1.21 | 2.02 | 1.53 | 1.52 |
| (5) | −1.51 | −1.62 | −2.36 | −0.67 | −1.60 |

| | Example 6 | Example 7 | Example 8 | Example 9 |
|---|---|---|---|---|
| (1) | 2.00 | 2.00 | 1.80 | 1.80 |
| (2) | 1.48 | 1.50 | 1.25 | 1.71 |
| (3) | 61.3 | 70.4 | 63.4 | 70.4 |
| (4) | 2.75 | 2.08 | 2.14 | 1.76 |
| (5) | −2.43 | −1.22 | −1.44 | −1.22 |

It is to be noted that, by properly combining the arbitrary embodiments of the aforementioned various embodiments, the effects possessed by them can be produced.

Although the present disclosure has been fully described in connection with the beneficial embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

Each of the entire disclosures of Japanese Patent Applications No. 2012-058298 filed on Mar. 15, 2012 and No. 2012-219653 filed on Oct. 1, 2012 including specification, claims, drawings, and summary is incorporated herein by reference in its entirety.

INDUSTRIAL APPLICABILITY

The inner focus lens according to each of the embodiments of the present disclosure can be applied to a digital still camera, a digital video camera, a camera of a cellular phone device, a camera of a smartphone, a monitoring camera in a monitoring system, a Web camera, an in-vehicle camera and the like, and particularly, is beneficial for a photographing optical system requiring high image quality, such as a digital still camera system and a digital video camera system.

What is claimed is:

1. A lens system having a plurality of lens groups each made up of at least one lens element, consisting of a first lens group, an aperture diaphragm, and a second lens group in order from an object side,
   wherein the first lens group has a configuration including a first lens element having positive power, a second lens element having positive power, and a third lens element having negative power in order from the object side, or a configuration including a first lens element having positive power, a second lens element having positive power, a third lens element having positive power, and a fourth lens element having negative power in order from the object side,
   one lens element as a focus lens in the second lens group is moved with respect to an image surface in focusing from an infinity focusing state to a close range focusing state,
   the second lens group has five or more lens elements, and
   the second lens group has a configuration including a negative lens element, a positive lens element, and a positive lens element in order from the object side.

2. The lens system according to claim 1, wherein the lens system satisfies the following condition:

$$nd1 > 1.75 \quad (1)$$

where nd1: a refractive index of the first lens element.

3. The lens system according to claim 1, wherein the lens system satisfies the following condition:

$$0.95 < DLA/D1S < 3.5 \quad (2)$$

where
   DLA: a summation of thicknesses on the optical axis of the lens elements making up the lens system, and
   D1S: a distance on the optical axis from an object-side surface of the first lens element to the aperture diaphragm.

4. The lens system according to claim 1, wherein the lens system satisfies the following condition:

$$vds > 55 \quad (3)$$

where
   vds: an Abbe number of the focus lens.

5. The lens system according to claim 1, wherein the lens system satisfies the following condition:

$$0.8 < |L/fF| < 3.5 \quad (4)$$

where
   L: a whole optical length in the lens system, and
   fF: a focal distance of the focus lens.

6. The lens system according to claim 1, wherein the lens elements making up the first lens group are each made of a single lens.

7. The lens system according to claim 1, wherein a second lens element from an image surface side making up the first lens group is a positive meniscus lens with a convex surface to the object side.

8. The lens system according to claim 1, wherein the lens element closest to an image surface of the second lens group has a concave surface to the object side.

9. The lens system according to claim 1, wherein the lens element closest to an image surface of the second lens group has negative power.

10. The lens system according to claim 1, wherein the lens system satisfies the following condition:

$$(R11+R12)/(R11-R12) < -1.0 \quad (5)$$

where
   R11: a curvature radius of an object side surface of the first lens element, and
   R12: a curvature radius of an image-surface side surface of the first lens element.

11. An interchangeable lens device comprising:
   a lens system; and
   a lens mounting portion connectable to a camera body including an image pickup device that receives an optical image formed by the lens system to convert the same to an electric image signal,
   the lens system having a plurality of lens groups each made up of at least one lens element, consisting of a first lens group, an aperture diaphragm, and a second lens group in order from an object side,
   wherein the first lens group has a configuration including a first lens element having positive power, a second lens element having positive power, and a third lens element having negative power in order from the object side, or a configuration including a first lens element having positive power, a second lens element having positive power, a third lens element having positive power, and a fourth lens element having negative power in order from the object side,
   a one lens element as focus lens in the second lens group is moved with respect to an image surface in focusing from an infinity focusing state to a close range focusing state,
   the second lens group has five or more lens elements, and
   the second lens group has a configuration including a negative lens element, a positive lens element, and a positive lens element in order from the object side.

12. A camera system comprising:
   an interchangeable lens device including a lens system; and
   a camera body that is detachably connected to the interchangeable lens device through a camera mounting portion, and includes an image pickup device that receives an optical image formed by the lens system to convert the same to an electric image signal,
   the lens system having a plurality of lens groups each made up of at least one lens element, consisting of a first lens group, an aperture diaphragm, and a second lens group in order from an object side, wherein the first lens group has a configuration including a first lens element having positive power, a second lens element having positive power, and a third lens element having negative power in order from the object side, or a configuration including a first lens element having positive power, a second lens element having positive power, a third lens element having positive power, and a fourth lens element having negative power in order from the object side, a one lens element as focus lens in the second lens group is moved with respect to an image surface in focusing from an infinity focusing state to a close range focusing state, the second lens group has five or more lens elements, and the second lens group has a configuration including a negative lens element, a positive lens element, and a positive lens element in order from the object side.

\* \* \* \* \*